(12) United States Patent
Wallace et al.

(10) Patent No.: US 8,210,432 B2
(45) Date of Patent: Jul. 3, 2012

(54) METHOD AND SYSTEM FOR ENCODING DATA, AND METHOD AND SYSTEM FOR READING ENCODED DATA

(75) Inventors: Michael Wallace, Vancouver, WA (US); Philip Trevor Odom, Portland, OR (US)

(73) Assignee: Pure Imagination, LLC, Vancouver, WA (US)

( * ) Notice: Subject to any disclaimer, the term of this patent is extended or adjusted under 35 U.S.C. 154(b) by 363 days.

(21) Appl. No.: 12/485,006

(22) Filed: Jun. 15, 2009

(65) Prior Publication Data

US 2009/0308924 A1 Dec. 17, 2009

Related U.S. Application Data

(60) Provisional application No. 61/132,620, filed on Jun. 20, 2008, provisional application No. 61/132,330, filed on Jun. 16, 2008, provisional application No. 61/132,235, filed on Jun. 16, 2008, provisional application No. 61/132,237, filed on Jun. 16, 2008, provisional application No. 61/132,238, filed on Jun. 16, 2008.

(51) Int. Cl.
*G06K 7/00* (2006.01)
(52) U.S. Cl. ........................................ 235/440; 235/441
(58) Field of Classification Search .................. 235/440, 235/441, 492
See application file for complete search history.

(56) References Cited

U.S. PATENT DOCUMENTS

| | | | | |
|---|---|---|---|---|
| 4,355,300 A | * | 10/1982 | Weber | 235/451 |
| 6,053,405 A | * | 4/2000 | Irwin et al. | 235/375 |
| 2008/0198501 A1 | * | 8/2008 | Kawabe | 360/77.06 |

* cited by examiner

*Primary Examiner* — Daniel Hess
(74) *Attorney, Agent, or Firm* — Philip R. M. Hunt; Kurt M. Rylander

(57) ABSTRACT

A method and system for encoding a numeric value by the placement of indicia at fixed sensing locations on a substrate, each indicium chosen from two or more sets of indicia, each set producing different responses in a sensor, and for decoding the numeric value by sensing the presence and character of the indicia with a set of sensors apposed to the fixed sensing locations.

9 Claims, 9 Drawing Sheets

Allowed  Disallowed

Allowed    Disallowed

METHOD AND SYSTEM FOR ENCODING DATA, AND METHOD AND SYSTEM FOR READING ENCODED DATA

CROSS-REFERENCE TO RELATED APPLICATION

This application claims priority to U.S. Provisional Patent Application Ser. No. 61/132,620, "Interactive Game System Incorporating Capacitive Sensing and Identifications" filed Jun. 20, 2008, U.S. Provisional Patent Application Ser. No. 61/132,330, "Method and System for Capacitive Sensing Using a Dual-Mode Interdigitated Sensor" filed Jun. 16, 2008, U.S. Provisional Patent Application Ser. No. 61/132,235, "Game System Incorporating Capacitive Sensing" filed Jun. 16, 2008, U.S. Provisional Patent Application Ser. No. 61/132,237, "Method and System for Encoding Data, and for Reading Encoded Data" filed Jun. 16, 2009, and U.S. Provisional Patent Application Ser. No. 61/132,238, "Method and System for Identifying a Game Piece" filed Jun. 16, 2008, each of which is herein incorporated by reference.

FIELD OF THE INVENTION

The present invention relates to the coding of a record and sensing of the coded record, using a particular sensor structure.

BACKGROUND

Modern computers are based on binary logic, in which any given bit of information is in one of two exclusive states, typically designated as 0 and 1. Binary coding schemes have long been used to allow marking and recognition of objects; early computers used punched paper cards to store information, with the holes being read by means of electrical, mechanical or optical sensing.

A more contemporary example of the use of binary coding with remote sensing is described by Weber in U.S. Pat. No. 4,355,300, where a series of sensing elements reads conductive indicia in fixed positions upon a substrate, each sensing position signaling the presence or absence of an indicium and the resulting binary bits forming a complete code value. U.S. Pat. No. 5,159,181, by Bartels et al., describes a similar sensing system wherein a single sensor moves past a series of multiple sensing locations on a substrate, or multiple sensing locations on a substrate are moved past a single sensor, with each sensing location producing a indication of one of two states, resulting in a binary code. The Bartels et al. system requires a means to move the sensor and the substrate relative to one another, and complex temporal analysis of the sensor waveform to extract the values corresponding to each sensing location. These exemplary systems rely on binary encoding to convey a value, thus reducing the range of code values that can be encoded by a given number of sensors or sensing locations.

A number of systems have been described for taking simultaneous or serial measurements from a series of sensors and analyzing the pattern of measurements to deduce information about an object in the vicinity of the sensors. U.S. Pat. No. 5,374,787 by Miller et al. describes the use of a parallel series of touch sensors, where the response of each sensor is compared to the no-touch condition, and the centroid of the response curve is determined to detect the position of touch along the series of sensors. U.S. Pat. No. 4,999,462 by Purcell describes a collinear series of triangular sensors and a circular excitor, where the pattern of response of the sensors is compared with a look up table to determine the location of the cursor. These exemplary systems use multiple sensor levels, but serve only to determine the location but not the identity of an object.

Commercially available MICR (magnetic ink character recognition) systems read indicia encoded on checks using magnetic ink and a specific character set designed so that a magnetic sensor produces a temporal signal pattern unique to each character when the check is moved past the sensor. The temporal signals are converted into the corresponding digits to determine the coded number/character sequence. While this system encodes more than one value per sensed position, the system requires special inks and printers to encode the numerical value on the substrate, a means to move the check past the sensor to create the signal, and sophisticated temporal processing and pattern recognition to decode the value.

The teachings of each of the above-listed citations (which does not itself incorporate essential material by reference) are herein incorporated by reference. None of the above inventions and patents, taken either singularly or in combination, is seen to describe the instant invention.

What is required is a system that overcomes the limitations of binary encoding to increase the range of values that can be encoded in with a fixed number of sensing locations on a substrate, but does not require complex and expensive means for moving the sensor and substrate relative to one another, nor complex temporal processing circuitry to extract the encoded value from the sensor readings.

SUMMARY AND ADVANTAGES

A method and system are described for encoding a numerical value on a substrate by utilizing a fixed number of sensing locations on the substrate, associated with an equal number of sensors disposed in a fixed relationship to the sensing locations, such that an indicium is overlaid on at least one of the sensing locations, where each indicium possesses one of at least two different characters and where each of the different characters produces a different response in a sensor. The numerical value is encoded by the number, characters and positions of indicia overlaid on the substrate.

In one embodiment of the invention, the indicia are pieces of conductive material of at least two different combinations of size and conductance, and the sensors are capacitive sensors.

In another embodiment of the invention, the indicia are pieces of magnetic material of at least two different combinations of size and flux, and the sensors are magnetic sensors.

In yet another embodiment of the invention, materials are chosen in two different characters and the code is a ternary code, with each sensing location producing one of three values and the encoded numerical value is the combination of the ternary codes of each sensing position.

In yet another embodiment of the invention, materials are chosen in N different characters and the code is a (N+1)-ary code, with each of k sensing locations producing one of (N+1) codes and the complete numerical value being one of the (N+1)k different possible values.

In yet another embodiment of the invention, materials are chosen in N different characters and k sensing locations are used, with an indicium having the highest sensor response being overlaid on at least one of the sensing locations, so that the sensors can be recalibrated during the sensing process.

In yet another embodiment of the invention, materials are chosen in N different characters and k sensing locations are used, with an indicium having the highest sensor response being overlaid on at least one of the sensing locations and no indicium being overlaid on at least one of the sensing locations, so that the sensors can be recalibrated during the sensing process.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
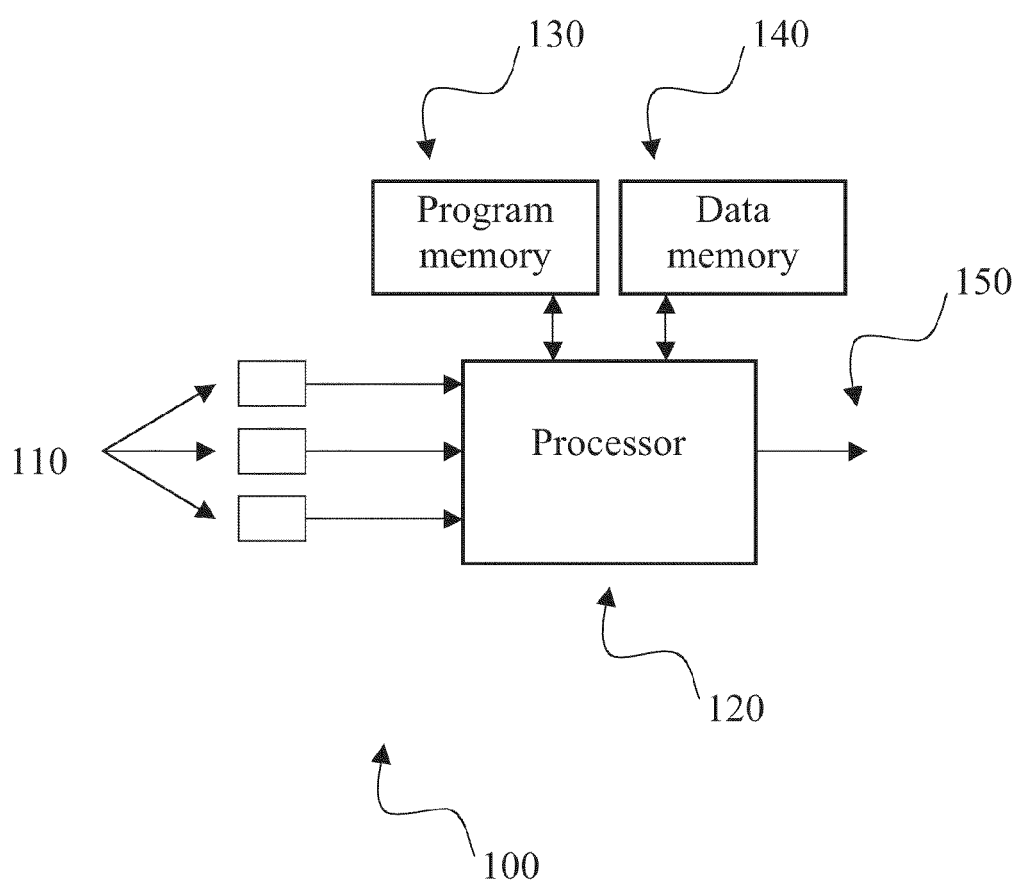
FIG. 1 depicts the component parts of an exemplary system incorporating the features of the invention.

FIG. 1 depicts the component parts of an exemplary system 100 for reading an encoded value using the method of the current invention. Two or more sensors 110 are connected to a processor 120, which also connects to a program memory 130 and a data memory 140. Under control of program instructions stored in program memory 130, processor 120 reads sensors 110 in sequence, and converts the sensor readings, using calibration data stored in data memory 140, into an output value which is reported to an external device through communication channel 150. One skilled in the art will recognize that program memory 130 and data memory 140 can be any type of memory including solid state, optical, magnetic, or other memory means; furthermore, program memory 130 and data memory 140 could be logical divisions of physical memory locating within a single memory system.

Figure 2:
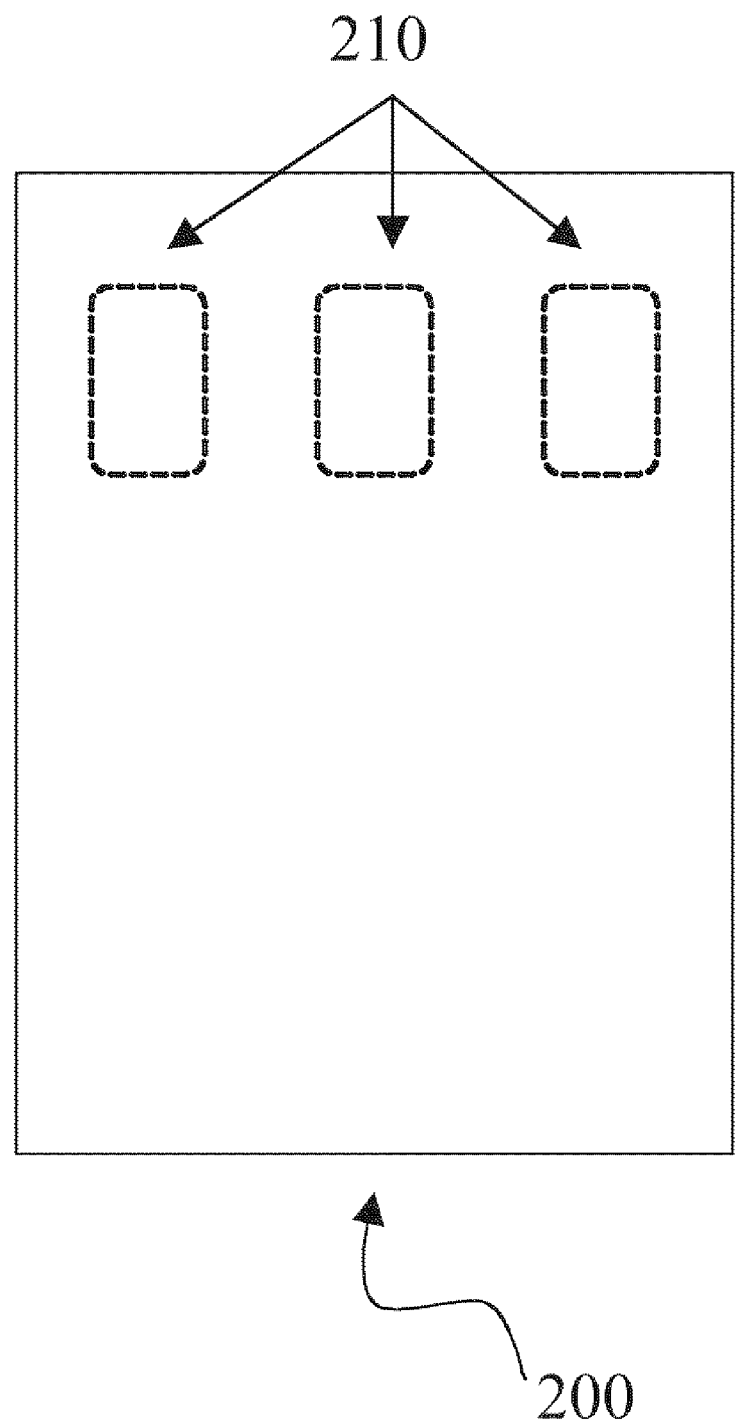
FIG. 2 shows a substrate upon which a value can be encoded.

In an exemplary embodiment of the invention, a substrate 200, shown in FIG. 2, carries a numerical value encoded by means of indicia placed at sensing locations 210, each sensing location 210 corresponding to the position of a sensor 110. Substrate 200 is brought into proximity to sensors 110, and processor 120 reads the values for each of the sensors 110 and decodes the readings to determine the numerical value.

Figure 3:
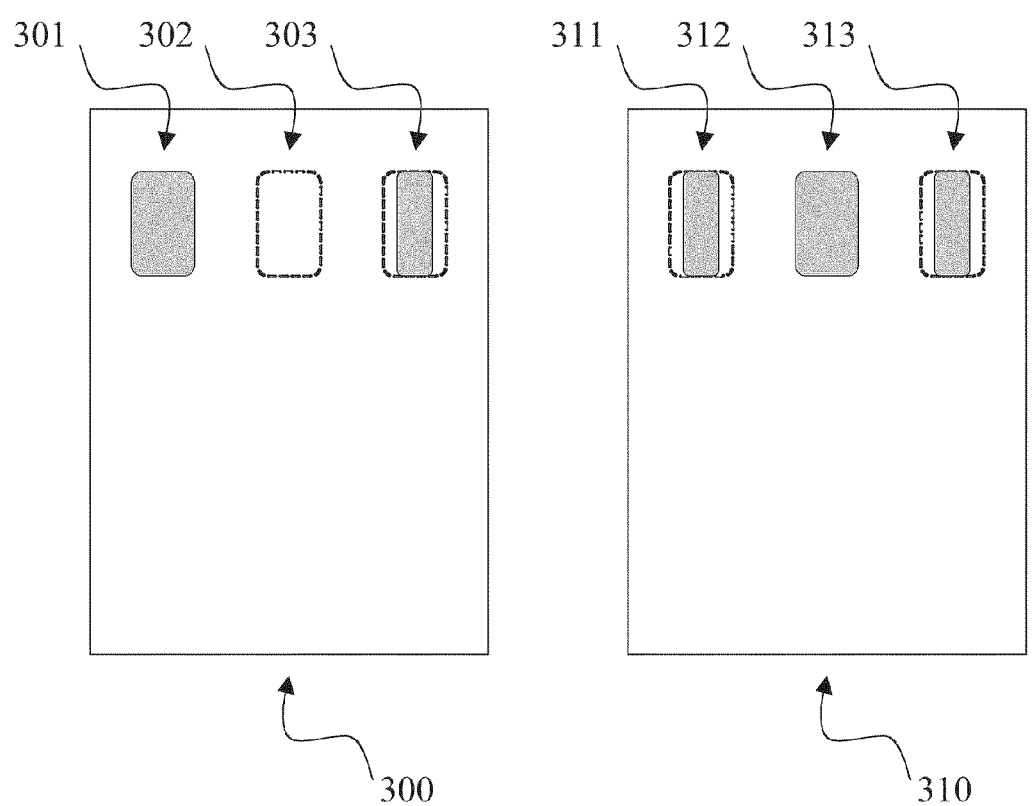
FIG. 3 shows two example code patterns in an exemplary embodiment of the system.

FIG. 3 shows two examples of encodings using an embodiment of the invention in which indicia of two different sizes are used to encode a numerical value. Substrate 300 contains an indicium of the larger size at sensing location 301, no indicium at sensing location 302, and an indicium of the smaller size at sensing location 303. Preferentially in this example the larger size indicium produces twice as much change in sensor reading as does the smaller size indicium, compared to the sensor reading with no indicium. In this example, a large indicium is assigned the value two (2), a small indicium is assigned the value one (1), and no indicium is assigned the value zero (0). Thus, the numerical value encoded on substrate 300 is 201 base-3, or 19 base-10. In similar fashion, the numerical value encoded on substrate 310 is one in sensor location 311, two in sensor location 312, and one in sensor location 313, yielding an encoded value of 121 base-3, or 16 base-10.

Figure 4:
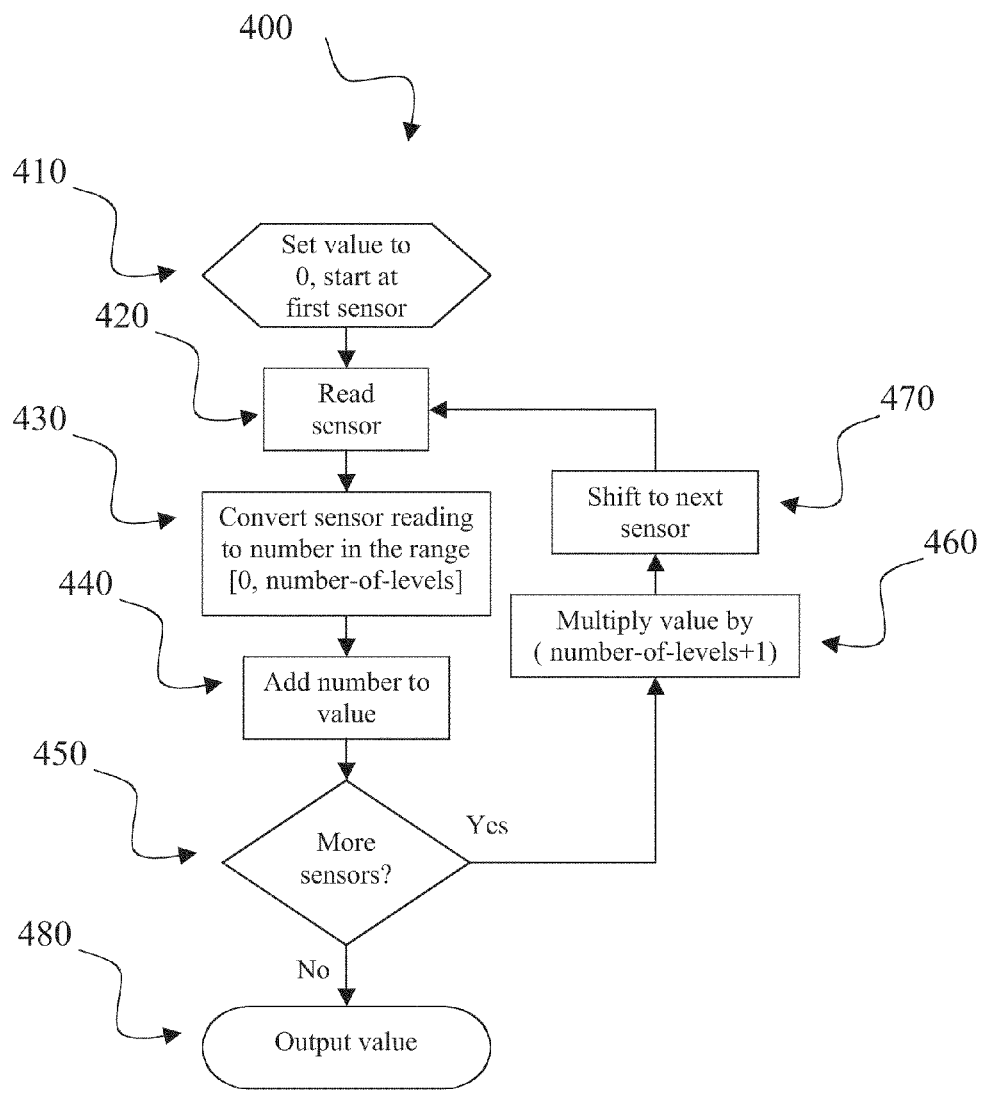
FIG. 4 shows a flow chart for processing the signals of an exemplary embodiment of the system.

FIG. 4 depicts a flowchart 400 of the processing steps required to read and decode a numerical value encoded using the method of the current invention. At a step 410, the decoded value is set to zero, and the first sensor is selected. At a further step 420, the value of the sensor is read.

At a further step 430, the sensor reading is converted to a number in the range between 0 and the number of characters, inclusive. The conversion is performed by comparing the sensor reading with calibration values stored in data memory 140 of the decoding system 100, using any of several conversion means well known to those skilled in the art. Preferentially, each different character for the indicia is chosen to produce a sensor reading that is easily distinguishable from the reading produced by indicia with the other characters.

At a further step 440, the number determined at a step 430 is added to the decoded value. At a further decision step 450, if more sensors remain to be read processing continues at a step 460, where the decoded value is multiplied by (number of character levels+1). At a further step 470, the next sensor is selected, and processing continues at a step 420.

At a decision step 450, if all sensors have been read, the decoded value is output at a step 480.

In an exemplary system with k sensing locations and N different material characters, a total of $(N+1)k$ different encoded values can be represented. However, preferentially values are encoded with at least one indicium on the substrate, which eliminates the single case where no indicium is overlaid on the substrate, leaving a total of $(N+1)k-1$ values that can be represented with this system. For the exemplary system shown in FIG. 3, a total of 26 values can be represented, compared to the seven values that could be represented with the binary system of Weber.

In an exemplary system with k sensing locations and N different material characters, a given numerical value between 1 and (N+1)k−1 is encoded by the following procedure. The value of V modulo (N+1) is computed, where the modulo operator yields the remainder after integer division. The result is between 0 and N. If the result is 0, then no indicium is overlaid on the first sensing location; if the result is non-zero, then an indicium from the set of pieces giving the N-th level sensor response is overlaid on the first sensing location. The value of V is then divided by (N+1) with the result truncated. The process is repeated, with each successive value of the modulus determining the indicium overlaid on successive sensing locations until all locations are considered.

Sensor noise and variation, variability of substrate and material composition, and uncertainty of positioning and alignment between substrate and sensors can all impact the reliability of the inventive system. For these reasons, in the preferred embodiment of the system, no more than four different material character values are used.

Figure 5:
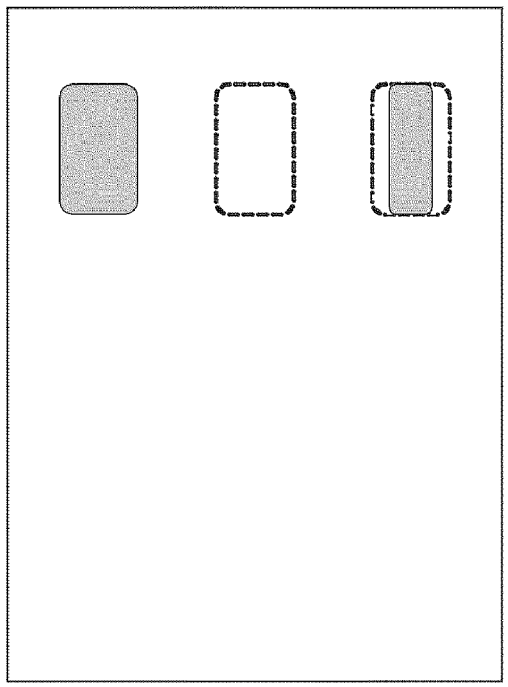
FIG. 5 shows allowed and disallowed code patterns in an alternative embodiment of the system.
Figure 5:
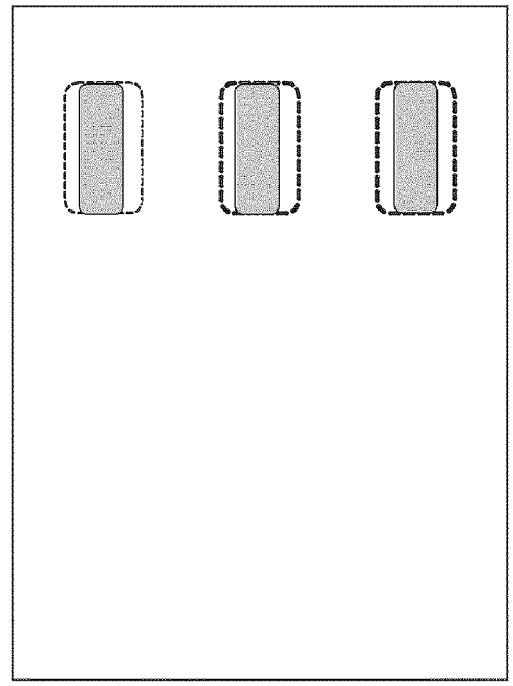

In an alternative embodiment of the inventive system, reliability is improved by calibrating the sensor response at the time the encoded value is read. In this alternative embodiment, an encoded value must include at least one sensing location at which an indicium is overlaid which produces the maximum variation in sensor output. For this alternative embodiment, FIG. 5 shows an example of an allowed code and an example of a disallowed code. In the latter case, no sensing location is overlaid with an indicium producing the maximum sensor variation.

Figure 6:
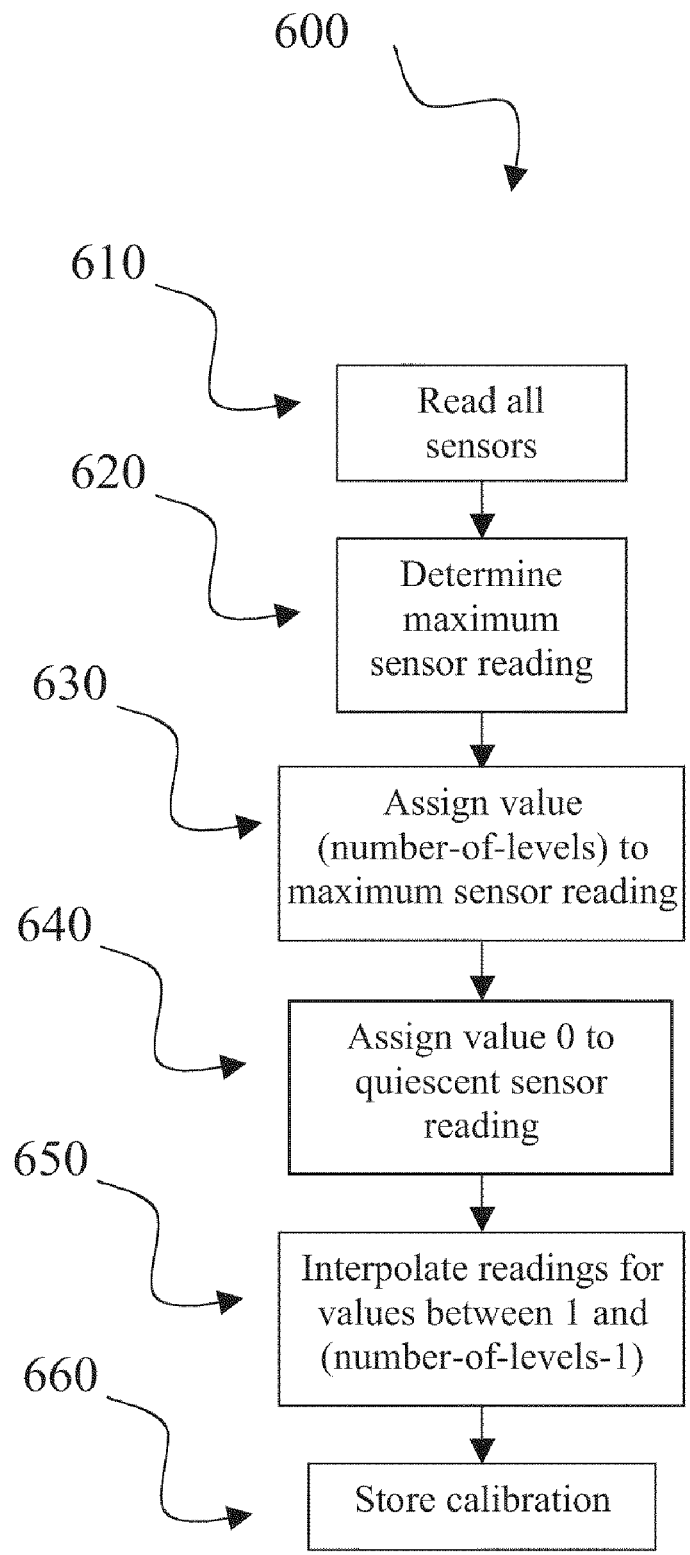
FIG. 6 shows a flow chart for calibrating the sensors in an alternative embodiment of the system.

For this alternative embodiment, FIG. 6 shows a flowchart 600 of the steps required to calibrate the maximum sensor output when reading an encoded value. At a first step 610, all sensors are read. At a further step 620, the maximum sensor reading is determined. Since in this alternative embodiment, at least one sensing location must have an indicium with the maximum response character, the maximum sensor reading corresponds to this case. Accordingly, at a further step 630, the maximum sensor reading is assigned to the maximum value N, where N is the number of different material sets. At a further step 640, the quiescent sensor value, measured when there is no object overlaid on the sensors, is assigned to the minimum value 0. At a further step 650, intermediate values between 0 and N are interpolated, using any several interpolation techniques common in the art. At a further step 660 the calibration values are stored for use in the decoding step 430. In the preferential implementation of this alternative embodiment, the character of the various sets of material is chosen to produce a linearly increasing response for each different character of material, and the interpolation is performed by subdividing the range of values between the quiescent sensor reading and the maximum sensor reading, assigning the sub-ranges thus determined to the various levels from 0 to N.

While an algorithm can be specified the encoding of a given numerical value in this alternative embodiment, in practice encoding and decoding are performed by reference to a table of code values constructed prior to encoding as follows. The set of all (N+1)k values is generated in (N+1)-ary form. Each value is examined in sequence, and the value is eliminated from the set if there is not at least one digit position with the value N. The resulting set of code values is ordered from smallest to largest, and assigned numerical indexes from 1 to M, where M is the total number of remaining values in the set. Thereafter, a numerical value in the range from 1 to M inclusive is encoded by selecting the corresponding entry in the set of code values, and the digit positions of the code value determine the placement of indicia on the sensing location as before. Decoding proceeds by means of the same table, comparing the decoded (N+1)-ary value with the code list, and outputting the corresponding index as the decoded numeric result.

Figure 7:
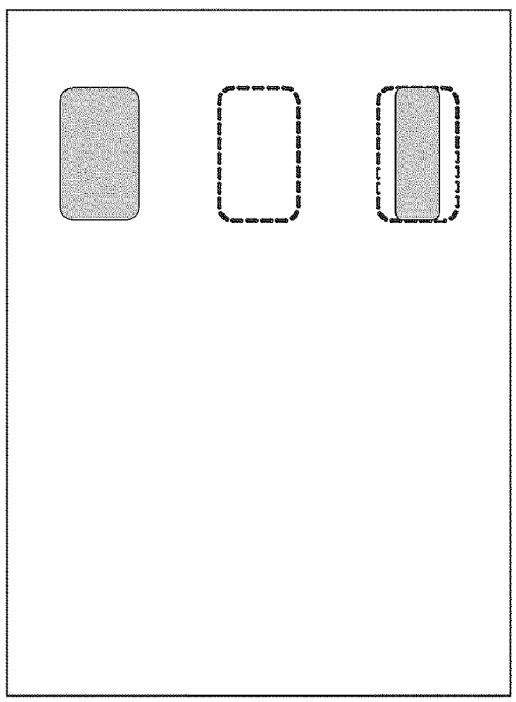
FIG. 7 shows allowed and disallowed code patterns in a further alternative embodiment of the system.
Figure 7:
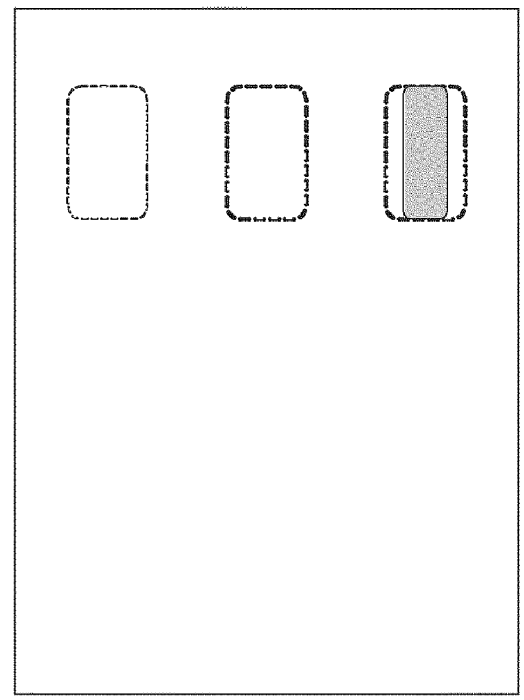

In a further alternative embodiment of the inventive system, reliability is further improved by calibrating the sensor response at the time the encoded value is read. In this alternative embodiment, an encoded value must include at least one sensing location at which an indicium is overlaid which produces the maximum variation in sensor output, and at least one sensing location with no indicium overlaid. For this alternative embodiment, FIG. 7 shows an example of an allowed code and an example of a disallowed code. In the latter case, no sensing location is overlaid with an indicium producing the maximum sensor variation.

Figure 8:
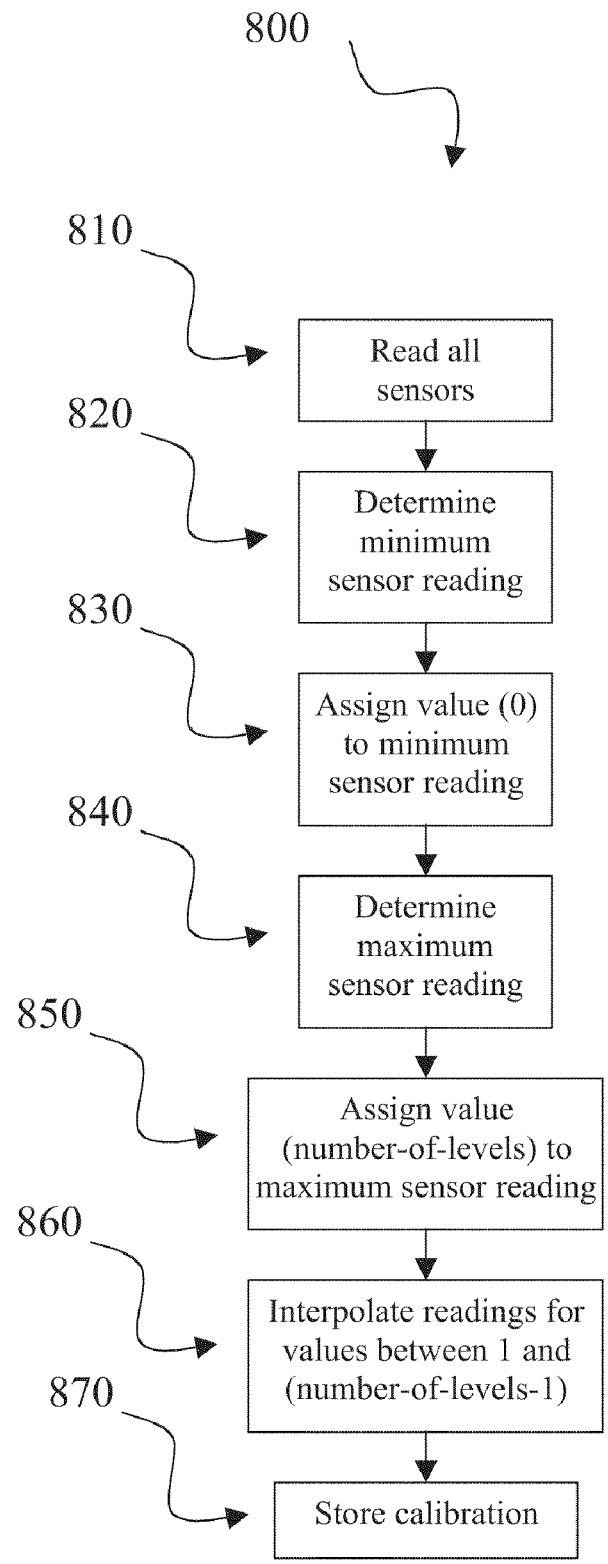
FIG. 8 shows a flow chart for calibrating the sensors in a further alternative embodiment of the system.

For this further alternative embodiment, FIG. 8 shows a flowchart 800 of the steps required to calibrate the sensors when reading an encoded value. At a first step 810, all sensors are read. At a further step 820, the minimum sensor reading is determined. Since in this alternative embodiment, at least one sensing location must have no indicium overlaid, the minimum sensor reading corresponds to this case. Accordingly, at a further step 830 the minimum sensor reading is assigned to the minimum value zero (0). At a further step 840, the maximum sensor reading is determined. Since in this alternative embodiment, at least one sensing location must have an indicium with the maximum response character, the maximum sensor reading corresponds to this case. Accordingly, at a further step 850, the maximum sensor reading is assigned to the maximum value N, where N is the number of different material sets. At a further step 860, intermediate values between 0 and N are interpolated, using any several interpolation techniques common in the art. At a further step 870 the calibration values are stored for use in the decoding step 430. In the preferential implementation of this further alternative embodiment, the character of the various sets of material is chosen to produce a linearly increasing response for each different character of material, and the interpolation is performed by subdividing the range of values between the minimum sensor reading and the maximum sensor reading, assigning the sub-ranges thus determined to the various levels from 0 to N.

While an algorithm can be specified the encoding of a given numerical value in this further alternative embodiment, in practice encoding and decoding are performed by reference to a table of code values constructed prior to encoding as follows. The set of all (N+1)k values is generated in (N+1)-ary form. Each value is examined in sequence, and the value is eliminated from the set if there is not at least one digit position with the value 0 and at least one digit position with the value N. The resulting set of code values is ordered from smallest to largest, and assigned numerical indexes from 1 to M, where M is the total number of remaining values in the set. Thereafter, a numerical value in the range from 1 to M inclusive is encoded by selecting the corresponding entry in the set of code values, and the digit positions of the code value determine the placement of indicia on the sensing location as before. Decoding proceeds by means of the same table, comparing the decoded (N+1)-ary value with the code list, and outputting the corresponding index as the decoded numeric result.

Figure 9:
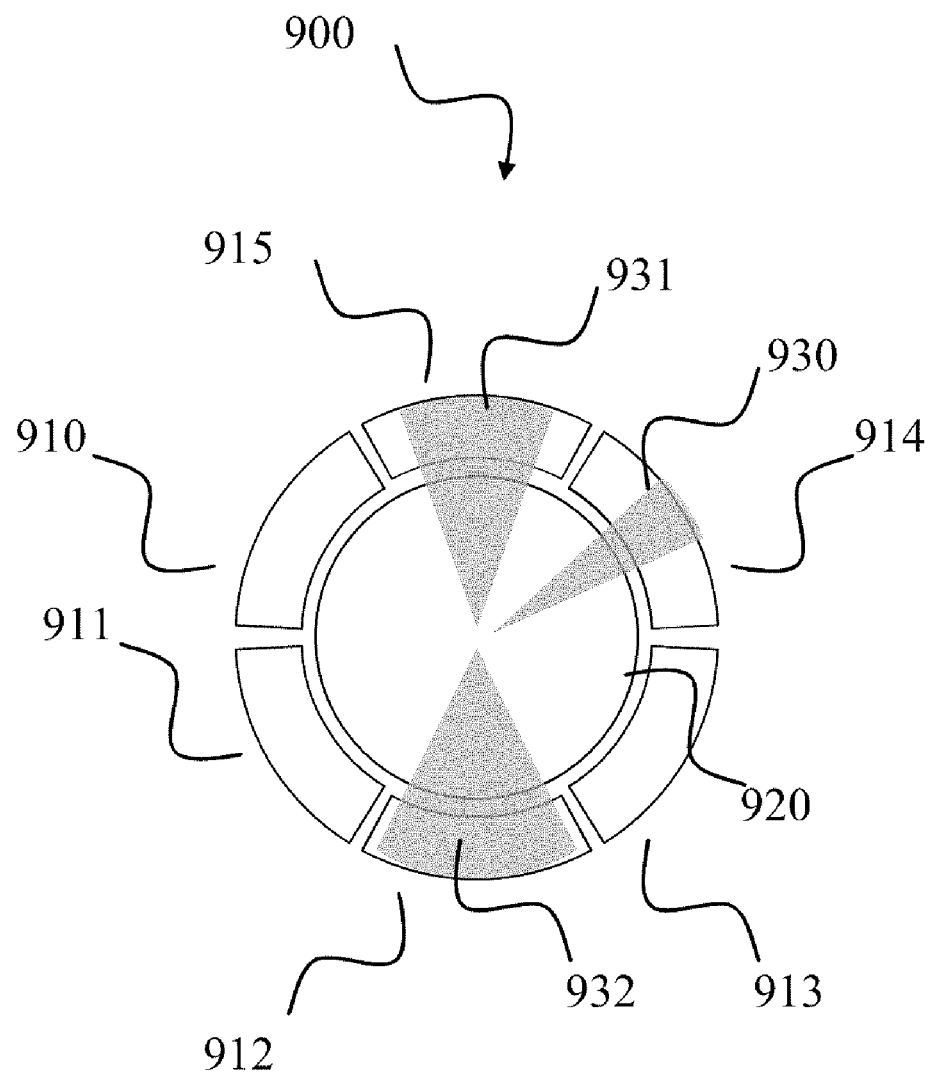
FIG. 9 depicts an alternative configuration for a sensor assembly.

The sensor configuration depicted in FIG. 2 has the limitation that the substrate must be placed in a fixed location and orientation with respect to the sensors to be read properly. The alternative sensor configuration depicted in FIG. 9 provides a method of partially overcoming these limitations. A sensor configuration 900 comprises a series of angular sensor segments 910, 911, 912, 913, 914, 915. In this exemplary depiction, the sensor segments 910, 911, 912, 913, 914, 915, comprise capacitive sensors that are measured relative to central ground segment 920. In this alternative embodiment, one or more indicia 930, 931, 932, are emplaced on a substrate so as to overlay the angular sensor segments, with the number, size and position of the indicia encoding the numerical value. FIG. 9 shows the substrate oriented such that indicium 930 overlays sensor segment 914, indicium 931 overlays sensor segment 915, and indicium 932 overlays sensor segment 912. If the substrate were rotated 60 degrees to the left, indicium 930 would overlay sensor segment 915, indicium 931 would overlay sensor segment 910, and indicium 932 would overlay sensor segment 913. The relative pattern of values measured in the sensor segments would be the same in these two orientations, and similarly in the other four possible orientations of the substrate with respect to the six sensor segments shown in FIG. 9. In this alternative configuration, the encoded numeric value is determined by analyzing the relative pattern of readings from the multiplicity of sensor segments, taking into account the symmetry of the sensor configuration. With k angular sensor segments, the patterns of number, size and position of indicia could be chosen so as to be unique with respect to the k-fold symmetry of the sensor segments, allowing the substrate to be placed in any of k angular orientations while still yielding a unique decoded value.

It will be apparent to one skilled in the art that the foregoing description of exemplary implementations is intended only to provide examples of the use of the invention, and is not a limitation upon the possible uses of the invention. Other similar embodiments could be designed or modified to utilize the features of this description without departing from the spirit and intention of this invention. Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

We claim:

1. A method for a system comprising a processor, a memory and an array of k number of sensors to read an encoded value on an object encoded with indicia in one or more of k sensing locations on the object, the indicia chosen from a set of N number of different material characters, the method comprising the steps of:
   (a) measuring k number of active sensor readings, one from each the sensors, while each of the sensors overlays a different one of the sensing locations, the active sensor readings including a maximum sensor reading and a minimum sensor reading;
   (b) retrieving from the memory a maximum value, a minimum value and the number N;
   (c) generating a code value comprising a series of k number of digits, each digit associated with a different one of the sensors, wherein generating the code value comprises the steps of:
      (1) assigning the maximum value to the digit associated with the sensor with the maximum sensor reading;
      (2) assigning the minimum value to the digit associated with sensor the minimum sensor reading; and
      (3) assigning values to the digits associated with the remaining active sensor readings by interpolation;
   (d) decoding the code value into a decoded numerical result using a code value table stored in the memory; and
   (e) outputting the decoded numerical result.

2. The method of claim 1 wherein the interpolation is performed by the steps of:
   (a) subdividing a sensor reading range from the minimum sensor reading to the maximum sensor reading into N+1 sub-ranges from a minimum sub-range to a maximum sub-range with N−1 intermediate sub-ranges in between;
   (b) generating N−1 intermediate values using the minimum value, the maximum value and the number N;
   (c) assigning the minimum value to the minimum sub-range, the maximum value to the maximum sub-range, and the intermediate values to the intermediate sub-ranges; and
   (d) assigning each of the digits in the code value with the value of the sub-range in which the active sensor reading associated with the digit lies.

3. A method for a system comprising a processor, a memory and an array of k number of sensors to read an encoded value on an object encoded with indicia in one or more of k sensing locations on the object, the indicia chosen from a set of N number of different material characters, the method comprising the steps of:
   (a) measuring a quiescent sensor reading from one of the sensors while the sensor does not overlay any of the sensing locations;
   (b) measuring k number of active sensor readings, one from each the sensors, while each of the sensors overlays a different one of the sensing locations, the active sensor readings including a maximum sensor reading and a minimum sensor reading;
   (c) retrieving from the memory a maximum value, a minimum value and the number N;
   (d) generating a code value comprising a series of k number of digits, each digit associated with a different one of the sensors, wherein generating the code value comprises the steps of:
      (1) assigning the maximum value to the digit associated with sensor with the maximum sensor reading; and
      (2) assigning values to the digits associated with the remaining active sensor readings by interpolating the remaining active sensor readings between the quiescent sensor reading and the maximum sensor reading;
   (e) decoding the code value into a decoded numerical result using a code value table stored in the memory; and
   (f) outputting the decoded numerical result.

4. The method of claim 3 wherein the interpolation is performed by the steps of:
   (a) subdividing a sensor reading range from the quiescent sensor reading to the maximum sensor reading into N+1 sub-ranges from a minimum sub-range to a maximum sub-range with N−1 intermediate sub-ranges in between;
   (b) generating N−1 intermediate values using the minimum value, the maximum value and the number N;
   (c) assigning the minimum value to the minimum sub-range, the maximum value to the maximum sub-range, and the intermediate values to the intermediate sub-ranges; and (d) assigning each of the digits in the code value with the value of the sub-range in which the active sensor reading associated with the digit lies.

5. A method for encoding numerical values onto objects, the method comprising steps of:
   (a) providing an object with k number of sensing locations;
   (b) providing information about a set of N number of different material characters and a set of values from 1 to N, each of the material characters associated with a different one of the values;
   (c) providing a code value table consistent with one generated by performing steps including:
      (1) generating a set of $(N+1)^k$ code values of k number of digits in length in (N+1)-ary form; and
      (2) eliminating from the set any code values that does not have at least one digit with the value N;
      (3) setting value M as the number of remaining code values in the set;
      (4) assigning numerical indexes from 1 to M to the code values in order from the smallest code value to the largest code value;
   (d) receiving a numerical value from 1 to M;
   (e) selecting a code value from the code value table with the numerical index that matches the numerical value; and
   (f) placing material characters on at least one of the k sensing locations, based on the code value selected.

6. The method of claim 5 wherein providing a code value table further comprises providing the code value table consistent with one generated by performing steps that include the step of eliminating from the set any code values that does not have at least one digit with the value zero.

7. A system to read an encoded value on an object encoded with indicia in one or more of k sensing locations on the object, the indicia chosen from a set of N number of different material characters, comprising:
   an array of k number of sensors;
   a processor;
   a memory with instructions stored therein, the instructions configured that when executed by the processor cause the system to perform a method comprising the steps of:
   (a) measuring k number of active sensor readings, one from each the sensors, while each of the sensors overlays a different one of the sensing locations, the active sensor readings including a maximum sensor reading and a minimum sensor reading;
   (b) retrieving from the memory a maximum value, a minimum value and the number N;
   (c) generating a code value comprising a series of k number of digits, each digit associated with a different one of the sensors, wherein generating the code value comprises the steps of:
      (1) assigning the maximum value to the digit associated with the sensor with the maximum sensor reading;
      (2) assigning the minimum value to the digit associated with sensor the minimum sensor reading; and
      (3) assigning values to the digits associated with the remaining active sensor readings by interpolation;
   (d) decoding the code value into a decoded numerical result using a code value table stored in the memory; and
   (e) outputting the decoded numerical result.

8. The system of claim 7 wherein the memory has further instructions that when executed on the processor cause the system to perform the interpolation by performing the steps of:
   (a) subdividing a sensor reading range from the minimum sensor reading to the maximum sensor reading into N+1 sub-ranges from a minimum sub-range to a maximum sub-range with N−1 intermediate sub-ranges in between;
   (b) generating N−1 intermediate values using the minimum value, the maximum value and the number N;
   (c) assigning the minimum value to the minimum sub-range, the maximum value to the maximum sub-range, and the intermediate values to the intermediate sub-ranges; and
   (d) assigning each of the digits in the code value with the value of the sub-range in which the active sensor reading associated with the digit lies.

9. A system for encoding numerical values onto an object with k number of sensing locations, comprising:
   a processor;
   a memory with instructions stored therein, the instructions configured that when executed by the processor cause the system to perform a method comprising the steps of:
   (a) obtaining information about a set of N number of different material characters and a set of values from 1 to N, each of the material characters associated with a different one of the values;
   (b) obtaining a code value table consistent with one generated by performing steps including:
      (1) generating a set of $(N+1)^k$ code values of k number of digits in length in (N+1)-ary form; and
      (2) eliminating from the set any code values that does not have at least one digit with the value N;
      (3) setting value M as the number of remaining code values in the set;
      (4) assigning numerical indexes from 1 to M to the code values in order from the smallest code value to the largest code value;
   (c) receiving a numerical value from 1 to M;
   (d) selecting a code value from the code value table with the numerical index that matches the numerical value; and
   (e) placing material characters on at least one of the k sensing locations, based on the code value selected.

* * * * *